United States Patent
Kim et al.

(10) Patent No.: US 9,359,715 B2
(45) Date of Patent: Jun. 7, 2016

(54) LAUNDRY TREATMENT APPARATUS AND CONTROL METHOD THEREOF

(71) Applicant: LG ELECTRONICS INC., Seoul (KR)

(72) Inventors: Taewan Kim, Seoul (KR); Gilnam Lee, Seoul (KR); Sanghee Yoo, Seoul (KR); Kwanghyun Kim, Seoul (KR)

(73) Assignee: LG ELECTORNICS INC., Seoul (KR)

( * ) Notice: Subject to any disclaimer, the term of this patent is extended or adjusted under 35 U.S.C. 154(b) by 41 days.

(21) Appl. No.: 14/472,631

(22) Filed: Aug. 29, 2014

(65) Prior Publication Data
US 2015/0059202 A1 Mar. 5, 2015

(30) Foreign Application Priority Data

Sep. 3, 2013 (KR) .................. 10-2013-0105542

(51) Int. Cl.
| | |
|---|---|
| *D06F 58/20* | (2006.01) |
| *D06F 58/28* | (2006.01) |
| *D06F 58/02* | (2006.01) |
| *D06F 25/00* | (2006.01) |

(52) U.S. Cl.
CPC ............. *D06F 58/28* (2013.01); *D06F 25/00* (2013.01); *D06F 58/02* (2013.01); *D06F 2058/2864* (2013.01); *D06F 2058/2877* (2013.01); *D06F 2058/2896* (2013.01); *D06F 2204/086* (2013.01)

(58) Field of Classification Search
CPC ......... D06F 58/20; D06F 58/23; D06F 58/28; F26B 19/00; F26B 19/21
USPC .......... 34/381, 413, 486; 68/5 C, 5 R, 19, 20; 8/149, 159
See application file for complete search history.

(56) References Cited

U.S. PATENT DOCUMENTS

| | | | |
|---|---|---|---|
| 3,651,580 A | 3/1972 | Meyer | |
| 2005/0016015 A1* | 1/2005 | Prajescu | D06F 58/08 34/601 |
| 2005/0044639 A1* | 3/2005 | Kim | D06F 58/28 8/149.1 |
| 2005/0188471 A1* | 9/2005 | Ahn | D06F 25/00 8/158 |
| 2006/0152178 A1* | 7/2006 | Carow | D06F 58/28 318/66 |
| 2007/0220683 A1* | 9/2007 | Kim | D06F 25/00 8/158 |
| 2007/0251119 A1 | 11/2007 | Kim et al. | |
| 2012/0174631 A1 | 7/2012 | Cho et al. | |
| 2012/0180534 A1 | 7/2012 | Cho et al. | |
| 2013/0091727 A1 | 4/2013 | Yoo et al. | |
| 2014/0020262 A1* | 1/2014 | Altinier | D06F 58/28 34/499 |

(Continued)

FOREIGN PATENT DOCUMENTS

| | | |
|---|---|---|
| CN | 100487183 C | 5/2009 |
| CN | 102535131 A | 7/2012 |
| CN | 103046288 A | 4/2013 |

(Continued)

*Primary Examiner* — Stephen M Gravini
(74) *Attorney, Agent, or Firm* — Dentons US LLP

(57) ABSTRACT

A control method of a laundry treatment apparatus, the control method including a drying operation with a circulation process for resupplying air discharged from a tub back into the tub, an exhaust process for discharging some of the air supplied into the tub, a suction process for supplying air outside of the tub into air circulated via the circulation process, and a heating process for heating the air to be supplied into the tub. Furthermore, the control method may include a motion execution operation for rotating a drum based on first motion during implementation of the drying operation, the drum being rotatably mounted in the tub and storing laundry therein.

12 Claims, 9 Drawing Sheets

(56) References Cited

U.S. PATENT DOCUMENTS

| | | | | |
|---|---|---|---|---|
| 2015/0059202 A1* | 3/2015 | Kim | ........................ | D06F 58/28 34/487 |
| 2015/0059413 A1* | 3/2015 | Yoo | ........................ | D06F 33/02 68/20 |

FOREIGN PATENT DOCUMENTS

| | | | | |
|---|---|---|---|---|
| EP | 1510612 | A2 | 3/2005 | |
| EP | 2014822 | A1 * | 1/2009 | .............. D06F 58/28 |
| EP | 2116647 | A1 | 11/2009 | |
| EP | 2465991 | A2 | 6/2012 | |
| GB | 1475130 | A | 6/1977 | |
| GB | 2094963 | A | 2/1982 | |
| KR | 10-2006-0004356 | A | 1/2006 | |
| KR | 10-2006-0060227 | A | 6/2006 | |
| KR | 10-2008-0071428 | A | 8/2008 | |
| KR | 10-2011-0016311 | A | 2/2011 | |
| KR | 10-2012-0040380 | A | 4/2012 | |
| KR | 20150026549 | A * | 3/2015 | .............. D06F 58/28 |

* cited by examiner (a)

(b)

(a)

(b)

(a)

(b)

LAUNDRY TREATMENT APPARATUS AND CONTROL METHOD THEREOF

This application claims the benefit of Korean Patent Application No. 10-2013-0105542, filed on Sep. 3, 2013, which is hereby incorporated by reference as if fully set forth herein.

BACKGROUND

1. Field

The present disclosure relates to a laundry treatment apparatus and a control method thereof.

2. Discussion of the Related Art

Laundry treatment apparatuses are electronic apparatuses that may implement washing and/or drying of a washing object (laundry). Examples of laundry treatment apparatuses include a washing machine, a drying machine, and a combined washing and drying machine.

Laundry treatment apparatuses that may function to dry laundry may be classified into laundry treatment apparatuses having an exhaust drying system and laundry treatment apparatuses having a circulation drying system according to how heated air (hot air) supplied to laundry after heat exchange between the air and the laundry is treated.

A circulation drying system is a system that condenses air discharged from a receiving space in which laundry is stored and thereafter heats the condensed air (i.e., heating after dehumidification) to resupply the air to the receiving space. An exhaust drying system is a system that continuously supplies hot air into the receiving space and discharges air subjected to heat exchange from the laundry treatment apparatus.

In the case of laundry treatment apparatuses having a circulation drying system, provision of a cooling water supply structure may be essential because it is necessary to dehumidify air discharged from the receiving space using cooling water prior to resupplying the air to the receiving space. Therefore, laundry treatment apparatuses having a circulation drying system may consume an excessive quantity of cooling water when cooling efficiency is low.

On the other hand, laundry treatment apparatuses having an exhaust drying system may cause excessive energy consumption because they discharge air exchanged heat with laundry despite the fact that the air has a higher temperature than that of outside air.

SUMMARY

The present disclosure is directed to a laundry treatment apparatus and a control method thereof that substantially obviate one or more problems due to limitations and disadvantages of the related art.

An object of the present invention is to provide a laundry treatment apparatus, and a control method thereof, with an advanced concept drying system which may reduce the consumption of energy and cooling water required to dry laundry.

Another object of the present invention is to provide a laundry treatment apparatus having a drying system which may achieve enhanced drying efficiency.

A further object of the present invention is to provide a laundry treatment apparatus, and a control method thereof, with a cooling water supply structure which may prevent cooling water from reaching laundry to be dried.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a control method of a laundry treatment apparatus, includes performing a drying operation including a circulation process for resupplying air discharged from a tub back into the tub, an exhaust process for discharging some of the air supplied into the tub, a suction process for supplying air outside of the tub into air circulated via the circulation process, and a heating process for heating the air to be supplied into the tub, and performing a motion execution operation for rotating a drum based on first motion during implementation of the drying operation, the drum being rotatably mounted in the tub and storing laundry therein, wherein the first motion includes a process of rotating the drum at a first Revolutions Per Minute (RPM), the first RPM being a value at which the centrifugal force of the laundry caused via rotation of the drum is greater than the weight of the laundry, and a process of rotating the drum at a second RPM, the second RPM value being greater than the first RPM value.

Time taken for the process of rotating the drum at the second RPM may be longer than time taken for the process of rotating the drum at the first RPM.

A ratio of time taken for the process of rotating the drum at the first RPM to time taken for the process of rotating the drum at the second RPM may be constant.

The control method of the laundry treatment apparatus may further include cooling water supply operation for supplying water required to cool an inner circumferential surface of the tub.

The control method of the laundry treatment apparatus may further include performing a mode selection operation for selecting whether or not to implement the cooling water supply operation prior to initiation of the drying operation.

The cooling water supply operation for supplying water required to cool the inner circumferential surface of the tub may be implemented during the motion execution operation.

The cooling water supply operation may be implemented while the drum is rotated at the second RPM.

The cooling water supply operation may be implemented only while the drum is rotated at the second RPM.

The control method of the laundry treatment apparatus may further include performing a mode selection operation for selecting whether or not to supply water required to cool an inner circumferential surface of the tub into the tub during implementation of the drying operation.

The motion execution operation may further include second motion to be implemented prior to execution of the first motion, and the second motion may include a process of rotating the drum at third RPM, the third RPM being a value at which the centrifugal force of laundry caused via rotation of the drum is greater than the weight of the laundry, and a process of stopping rotation of the drum before the drum completes 1 revolution.

The process of stopping rotation of the drum may be initiated when laundry is raised above half a height of the drum.

The process of stopping rotation of the drum may be implemented when laundry is rotated by an angle of between 90 degrees and 180 degrees relative a lowermost point of a rotation track of the drum.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
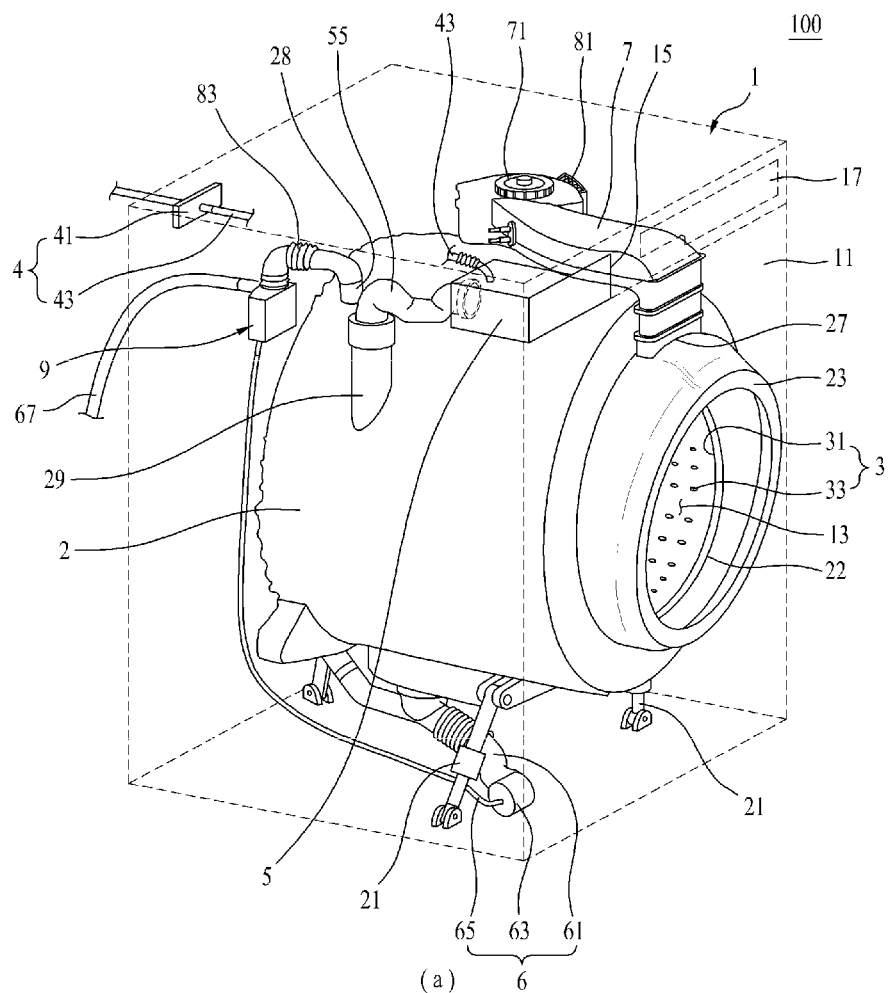
FIGS. 1a, 1b, and 2 show a laundry treatment apparatus according to the present invention.
Figure 1:
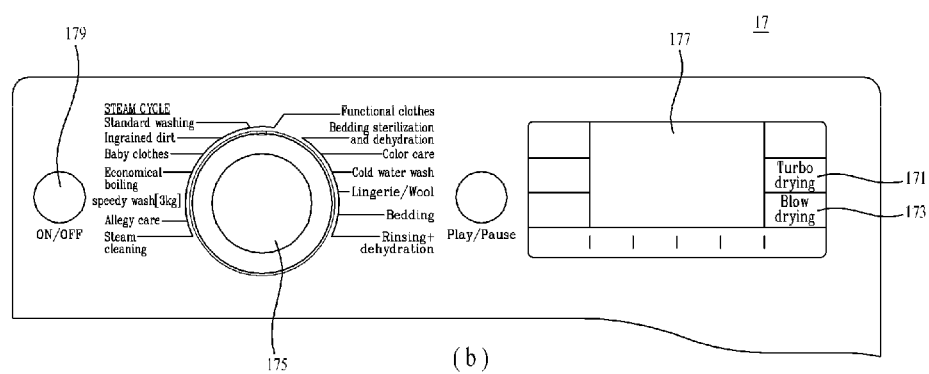

Hereinafter, exemplarily embodiments of the present invention will be described in detail with reference to the accompanying drawings. Meanwhile, a configuration of an apparatus that will be described hereinafter and a control method of the apparatus are provided for explanation of the exemplarily embodiments of the present invention and are not intended to limit the technical scope of the present invention. The same reference numerals of the entire specification designate the same constituent elements.

Figure 2:
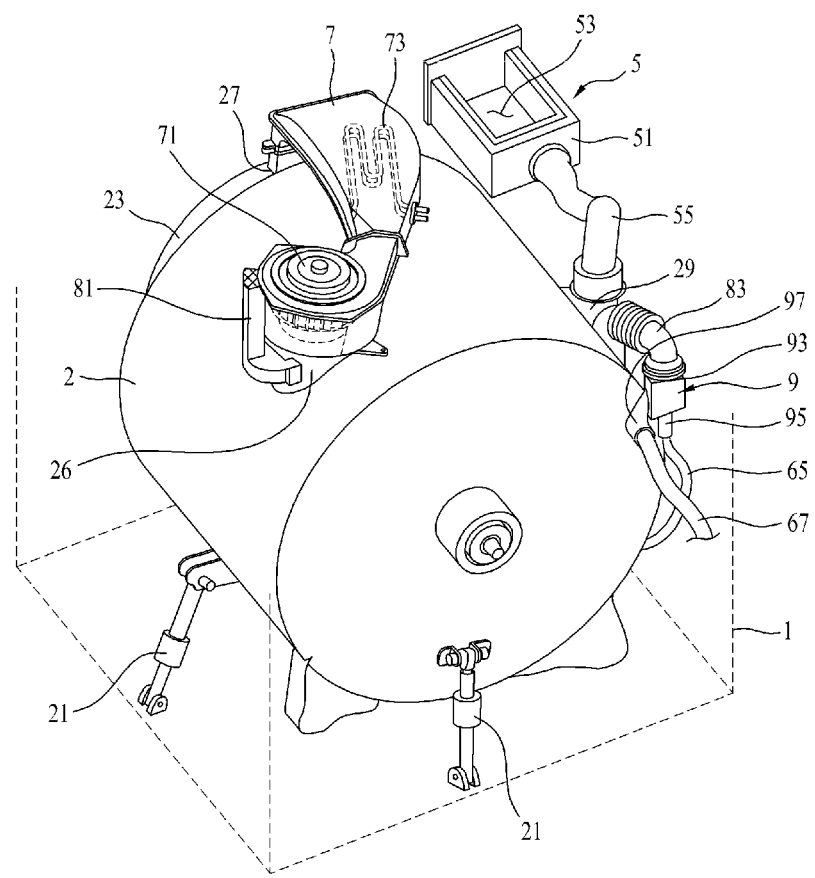

As exemplarily shown in FIGS. 1a, 1b and 2, a laundry treatment apparatus of the present invention, designated by reference numeral 100, includes a cabinet 1 defining an external appearance of the apparatus 100, laundry receptacles 2 and 3 placed within cabinet 1 and configured to store a washing object (laundry) and wash water therein, a circulation duct 7 through which interior air of laundry receptacles 2 and 3 is circulated, an exhaust duct 83 through which some of the interior air of laundry receptacles 2 and 3 is discharged from laundry receptacles 2 and 3, a suction duct 81 through which outside air is supplied into laundry receptacles 2 and 3 and a heating unit configured to supply heated air into laundry receptacles 2 and 3.

Cabinet 1 includes a front panel 11 defining a front surface of the laundry treatment apparatus 100. Front panel 11 is provided with an opening 13 through which laundry is introduced into or removed from laundry receptacles 2 and 3.

Opening 13 is opened or closed by a door (14 see FIG. 6) rotatably coupled to the cabinet 1.

In addition, a control panel 17 may be mounted to front panel 11. Control panel 17 serves as a user interface to enable information exchange between a user and a controller (not shown) of laundry treatment apparatus 100.

More specifically, control panel 17 includes a power input part 179 which assists the user in inputting a power supply instruction to laundry treatment apparatus 100 and an input part 175 which assists the user in selecting a laundry treatment method that laundry treatment apparatus 100 can provide.

The "laundry treatment method" selected via input part 175 is a set of time-variant control instructions or time-invariant control instructions required to allow the controller (not shown) to control respective devices included in laundry treatment apparatus 100 so as to supply moisture or air to laundry.

The "laundry treatment method" as described above is typically called a laundry treatment course, a control method of a laundry treatment apparatus, or the like. A plurality of laundry treatment methods may programmed set in the laundry treatment apparatus 100.

In addition, control panel 17 may further include a display part 177 which displays information regarding the laundry treatment method selected by the user or an operation procedure of laundry treatment apparatus 100.

The "information regarding the operation procedure of the laundry treatment apparatus" displayed on display part 177 includes the name of a laundry treatment method selected by the user via input part 175, a set time for the selected laundry treatment method, a completion target time or remaining time of a laundry treatment method that is being executed, requirements that laundry treatment apparatus 100 requests the user for execution of the laundry treatment method selected by the user, and the like (i.e., information related to operation of the laundry treatment apparatus 100).

The laundry receptacles accommodated in cabinet 1 may include a tub 2 in which wash water is stored and a drum 3 in which laundry is stored, drum 3 being rotatably accommodated in tub 2.

Tub 2 has a cylindrical shape and is fixed in cabinet 1 via tub support members 21. Tub 2 has a tub opening 22 formed in a front surface thereof to communicate with opening 13.

A gasket 23 is interposed between the tub opening 22 and opening 13. Gasket 23 may serve not only to prevent vibration generated by the tub 2 from being transmitted to cabinet 1, but also to prevent leakage of wash water stored in tub 2. To this end, gasket 23 may be formed of an elastic material, such as rubber.

Drum 3 is rotatably supported in tub 2 via a drive unit M (see FIG. 6) that is mounted to a rear surface of tub 2. Drum 3 has a drum opening 31 communicating with tub opening 22 and through-holes 33 perforated in the circumference of drum 3.

Circulation duct 7 serves as a flow path through which interior air of tub 2 is discharged from tub 2 and then is again guided into tub 2. Circulation duct 7 may be installed on the top of an outer circumferential surface of tub 2.

To couple with circulation duct 7, tub 2 may have a first communication portion 26 and a second communication portion 27.

As exemplarily shown in FIG. 2, first communication portion 26 serves as a flow path through which interior air of tub 2 is guided to circulation duct 7, and second communication portion 27 serves as a flow path through which air introduced into circulation duct 7 is guided to tub 2.

Second communication portion 27 may be formed in gasket 23. That is, second communication portion 27 takes the form of an aperture formed in gasket 23 and an air outlet of circulation duct 7 may be fitted into the aperture formed in gasket 23.

Although both first communication portion 26 and second communication portion 27 may be formed in the circumference of tub 2, positioning second communication portion 27 at gasket 23 may guide air discharged from circulation duct 7 to the center of drum 3 through drum opening 31, which may advantageously increase heat exchange efficiency between the laundry and the air.

The heating unit, provided to supply heated air into tub 2, may include a fan 71 and a heater 73 which are accommodated in circulation duct 7. Fan 71 serves not only to move interior air of tub 2 into circulation duct 7 through first communication portion 26, but also to move the air introduced into circulation duct 7 to second communication portion 27. Heater 73 serves to heat the air moved to second communication portion 27 by fan 71.

In this case, first communication portion 26 and second communication portion 27 may be located in a diagonal direction on the basis of a cross section of tub 2 parallel to the ground on which cabinet 1 is supported. Heater 73 may be located such that a portion of heater 73 extends in a longitudinal direction of circulation duct 7. Increase in the length of the flow path defined by circulation duct 7 serves to achieve sufficient time required to heat air moving through circulation duct 7.

In laundry treatment apparatus 100 of the present invention, some of air to be supplied to heater 73 is introduced through suction duct 81 and some of the hot air supplied into tub 2 is discharged from the tub 2 through exhaust duct 83.

Suction duct 81 may be located in a flow path along which interior air of tub 2 is guided to fan 71. This serves to allow interior air of tub 2 as well as outside air of tub 2 to be introduced into and circulated through circulation duct 7 by fan 71 installed in circulation duct 7 without providing suction duct 81 with an additional air introduction device.

FIG. 2 shows a case in which suction duct 81 causes outside air of tub 2 to be introduced into circulation duct 7 through first communication portion 26 by way of example. In this case, negative pressure is applied to first communication portion 26 upon rotation of fan 71, causing interior air of tub 2 as well as air outside of tub 2 to be introduced into circulation duct 7.

Figure 3:
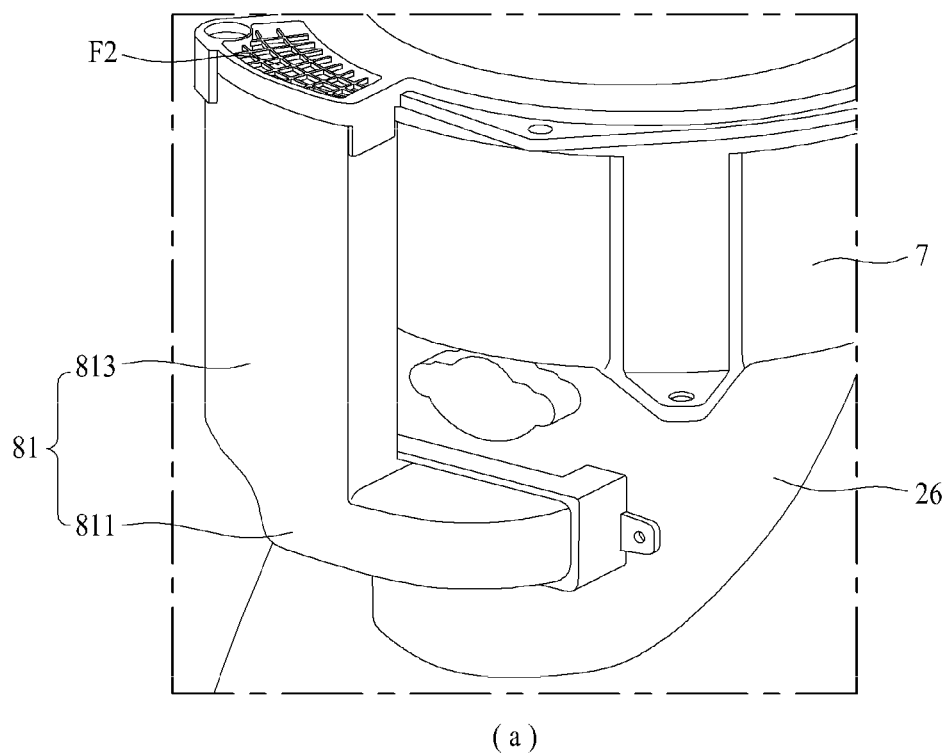
FIGS. 3a and 3b shows a suction duct included in the laundry treatment apparatus according to the present invention.
Figure 3:
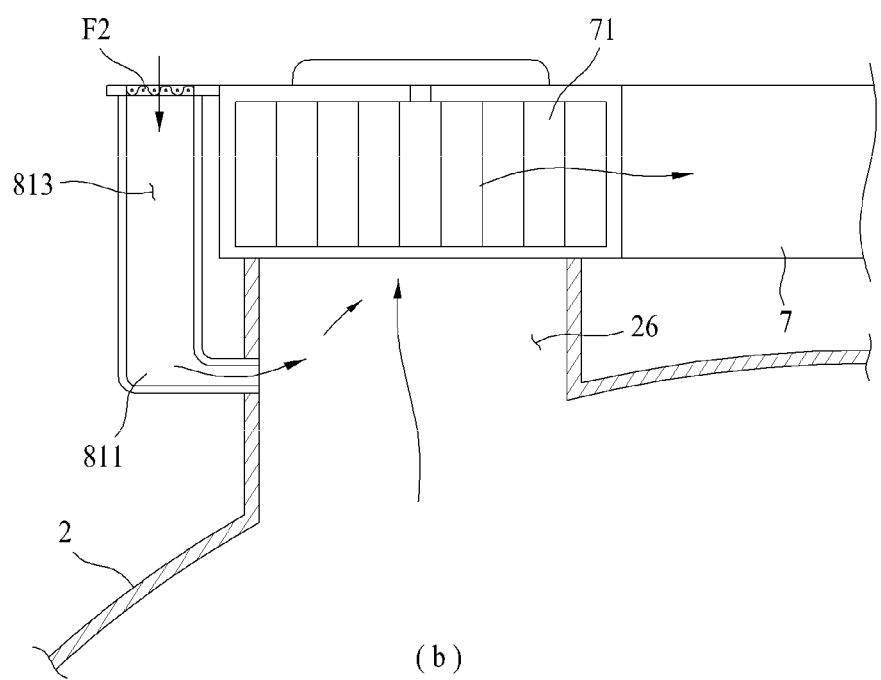

Meanwhile, as exemplarily shown in FIGS. 3a and 3b, suction duct 81 according to the present invention does not require a control device (e.g., a valve) to control opening/closing of suction duct 81. That is, the suction duct 81 according to the present invention may be continuously kept open.

Suction duct 81 may be comprised of a communication section 811 communicating with first communication portion 26 and an extension section 813 extending from coupling section 811 to circulation duct 7. Extension section 813 may extend from communication section 811 in a height direction of tub 2 by a predetermined length (in other words, extension section 813 may extend from communication section 811 to circulation duct 7). This serves to prevent bubbles generated by detergent during washing of laundry from being discharged from tub 2 through suction duct 81.

Additionally, suction duct 81 may further include a filter F2 which filters air to be introduced into extension section 813. Filter F2 may be installed to circulation duct 7 and extension section 813 may be fixed at filter F2. That is, suction duct 81 according to the present invention has one end fixed to tub 2 and the other end fixed to circulation duct 7.

This configuration is achieved as circulation duct 7 is fixed at the top of the outer circumferential surface of tub 2. Considering the laundry treatment apparatus 100 in terms of a vibration system, circulation duct 7 and tub 2 will exhibit almost the same vibration and, therefore, the vibrations have no effect on the durability of suction duct 81 installed to interconnect tub 2 and circulation duct 7.

Assuming a configuration in which circulation duct 7 is fixed to cabinet 1 rather than being fixed at the top of the outer circumferential surface of tub 2, circulation duct 7 will vibrate independent of vibrations of tub 2, which makes it difficult to maintain durability of suction duct 81 without an additional vibration absorbing device.

Exhaust duct 83 may be installed at any position of tub 2 so long as it can discharge some of air introduced into tub 2 through circulation duct 7 to the outside of tub 2.

FIG. 1 shows a case in which exhaust duct 83 is installed to a third communication portion 28 formed at an upper position of the circumference of tub 2. When air is suctioned into tub 2 by fan 71, the interior of tub 2 becomes a positive pressure state, causing some of the interior air of tub 2 to be discharged to the outside of tub 2 having atmospheric pressure (i.e., lower pressure than the interior of tub 2) through exhaust duct 83 and the remaining interior air of tub 2 to move into circulation duct 7 through first communication portion 26 having negative pressure.

To allow only some of the air, supplied into tub 2 through circulation duct 7 to be discharged through exhaust duct 83, the cross sectional area of exhaust duct 83 may be less than the cross sectional area of first communication portion 26 (or the cross sectional area of circulation duct 7).

Meanwhile, to maintain a constant flow rate of air into tub 2, the flow rate of air that can be discharged from exhaust duct 83 (exhaustion capacity) may be equal or similar to the flow rate of air that can be suctioned into suction duct 81 (suction capacity).

Although exhaust duct 83 may be configured to communicate the interior of tub 2 with the outside of cabinet 1 so as to guide air introduced through exhaust duct 83 to the outside of cabinet 1, exhaust duct 83 may be connected to a drain unit 6 that serves to discharge wash water from tub 2.

When exhaust duct 83 is in direct communication with the outside of cabinet 1, air discharged from exhaust duct 83 may be condensed on an indoor wall because the air discharged through exhaust duct 83 is humid air.

Laundry treatment apparatus 100 of the present invention may solve the problem described above by connecting exhaust duct 83 to drain unit 6 that is included to discharge wash water in tub 2 to the outside of cabinet 1.

In this case, a flow path switchover unit 9 may be installed at a junction of exhaust duct 83 and drain unit 6 to control opening/closing of exhaust duct 83 and drain unit 6. This serves to prevent air discharged through exhaust duct 83 from entering tub 2 and to prevent water discharged through drain unit 6 from entering tub 2.

Drain unit 6 according to the present invention may include a first drain flow path 61 and a pump 63 which serve to discharge wash water from tub 2, a second drain flow path 65 through which the wash water having passed through pump 63 is guided to flow path switchover unit 9 and a third drain flow path 67 through which water directed to flow path switchover unit 9 is guided to an outdoor location (not shown), such as a drain.

Flow path switchover unit 9 installed at the junction of exhaust duct 83 and drain unit 6 may be located higher than the set maximum water level H (see FIG. 6) of tub 2.

Conventional laundry treatment apparatuses generally include a structure (hereinafter referred to as water trap) to prevent water in a flow path connected to the outdoor location (i.e., the aforementioned third drain flow path) from being completely discharged, in order to prevent bad smell from entering the laundry treatment apparatus through the third drain flow path.

In a case in which exhaust duct 83 according to the present invention is connected to the drain unit provided with the water trap, interior air of tub 2 cannot be discharged from the tub 2 through exhaust duct 83 during drying of laundry. Therefore, under connection of exhaust duct 83 to the drain unit of conventional laundry treatment apparatuses, a controller needs to control revolutions per minute of the fan to blow air at pressure sufficient for removal of the water trap.

However, in a case in which flow path switchover unit 9 is located higher than the set maximum water level of the tub 2 according to the present invention, exhaust duct 83 serves as an anti-siphon member to create a water trap between flow path switchover unit 9 and pump 63 (in the second drain flow path 65), thereby preventing bad smell from entering tub 2.

Air introduced into exhaust duct 83 may be discharged from tub 2 through flow path switchover unit 9 and third drain flow path 67, and therefore it is unnecessary to control revolutions per minute of fan 71 for removal of the water trap.

Additionally, through the configuration as described above, even if wash water is supplied to the set maximum water level of tub 2, it is possible to prevent wash water from being unintentionally discharged from tub 2 through drain unit 6.

Figure 4:
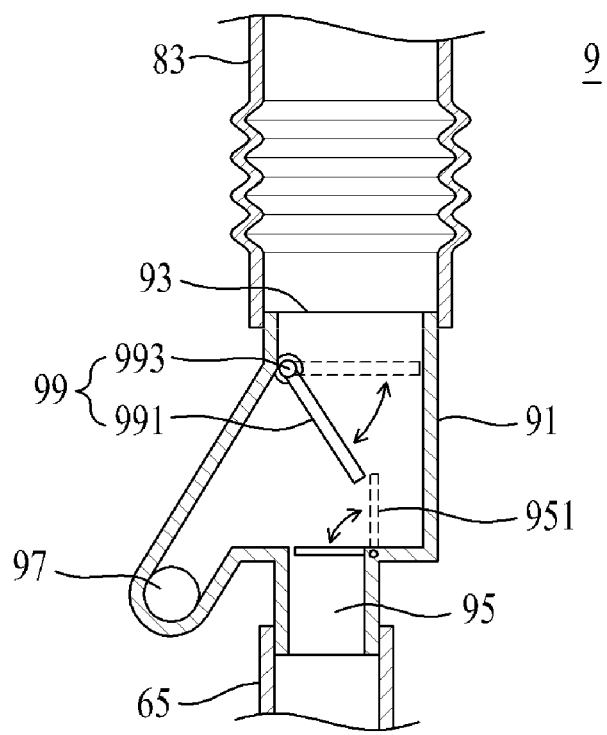
FIG. 4 shows a flow path switchover unit included in the laundry treatment apparatus according to the present invention.

Flow path switchover unit 9 according to the present invention may have a shape as exemplarily shown in FIG. 4.

Flow path switchover unit 9 may include a switchover unit body 91 located at a junction of exhaust duct 83 and second drain flow path 65, a duct connection pipe 93 connecting exhaust duct 83 and switchover unit body 91 to each other, a flow path connection pipe 95 connecting second drain flow path 65 and switchover unit body 91 to each other, and a discharge pipe 97 connecting third drain flow path 67 and switchover unit body 91 to each other.

Duct connection pipe 93 and flow path connection pipe 95 may be arranged to face each other. Duct connection pipe 93 may be located at the top of switchover unit body 91 and flow path connection pipe 95 may be located at the bottom of switchover unit body 91.

In this case, a switchover valve 99 to open or close duct connection pipe 93 is received in switchover unit body 91. Switchover valve 99 includes a valve body 991 configured to open or close duct connection pipe 93 and a valve rotating shaft 993 configured to rotatably couple valve body 991 to switchover unit body 91.

Valve body 991 keeps duct connection pipe 93 open by the weight thereof, but duct connection pipe 93 is closed by water pressure when wash water is introduced into switchover unit body 91 through second drain flow path 65.

Meanwhile, flow path switchover unit 9 having the configuration as described above may prevent wash water discharged from tub 2 from entering tub 2 through duct connection pipe 93, but may not eliminate the possibility of air discharged from tub 2 being resupplied to tub 2 through flow path connection pipe 95.

As described above, owing to the water trap created in second drain flow path 65, the present invention may prevent air discharged through exhaust duct 83 from entering tub 2. However, the water trap may not be created in second drain flow path 65 when no discharge of wash water ever happens before drying of laundry.

Accordingly, flow path switchover unit 9 according to the present invention may further include a flow path valve 951 to open or close flow path connection pipe 95. Flow path valve 951 may include a check valve which opens flow path connection pipe 95 only when wash water is introduced into switchover unit body 91 through second drain flow path 65.

As exemplarily shown in FIGS. 1 and 2, laundry treatment apparatus 100 of the present invention may further include a water supply unit 4 which supplies wash water into tub 2 and a detergent supply unit 5 which supplies detergent into tub 2.

Water supply unit 4 may include a water supply flow path 43 which connects tub 2 and the water supply source (not shown) at the outside of laundry treatment apparatus 100 to each other and a water supply valve 41 which opens or closes water supply flow path 43 under control of the controller (not shown).

Meanwhile, detergent supply unit 5 may include a detergent reservoir 53 in which detergent is stored and a tub supply pipe 55 which connects detergent reservoir 53 and tub 2 to each other. Water supply flow path 43 may have any shape so long as it can supply water to the detergent reservoir 53. In this case, detergent stored in detergent reservoir 53 and water required for laundry washing may be supplied into tub 2 as soon as the controller (not shown) opens water supply valve 41.

Meanwhile, detergent reservoir 53 may be withdrawn from front panel 11. To this end, detergent supply unit 5 may include a body 51 configured to support detergent reservoir 53 such that detergent reservoir 53 may be withdrawn from front panel 11. Front panel 11 has a reservoir opening 15 through which detergent reservoir 53 is withdrawn.

In this case, the interior of detergent reservoir 53 must communicate with body 51 and tub supply pipe 55 must be configured to enable communication between body 51 and the interior of tub 2.

The controller (not shown) may control water supply unit 4 to allow water supply unit 4 to supply water required to cool the tub 2 (required to condense interior air of tub 2) into tub 2 (for enhancement of drying efficiency).

In consideration of the fact that humid interior air of tub 2 may be condensed in detergent supply unit 5 and supplying water into tub 2 during drying of laundry may unintentionally cause laundry stored in drum 3 to be wet, laundry treatment apparatus 100 of the present invention may further include a water supply guide 25 for communication between tub supply pipe 55 and tub 2.

Water supply guide 25 according to the present invention has a feature of defining a water trap (of continuously storing a constant amount of water to prevent communication between tub 2 and detergent supply unit 5), so as to prevent interior air of tub 2 from entering detergent supply unit 5 and to cause water supplied into tub 2 via water supply unit 4 to move to the bottom of tub 2 along an inner circumferential surface of tub 2 so as not to reach laundry stored in drum 3.

Figure 5:
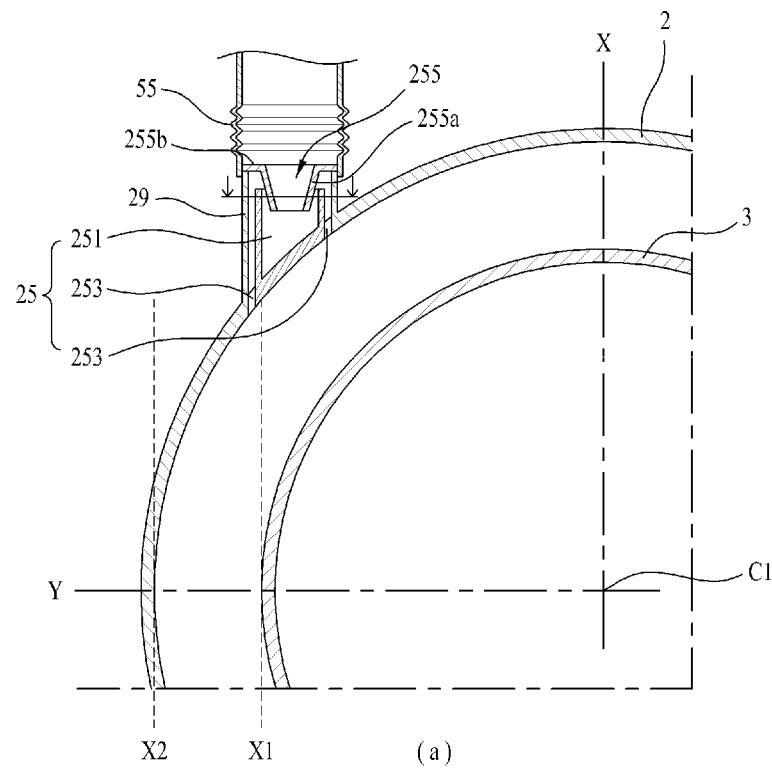
FIGS. 5a and 5b shows a water supply unit and a water supply guide included in the laundry treatment apparatus according to the present invention.
Figure 5:
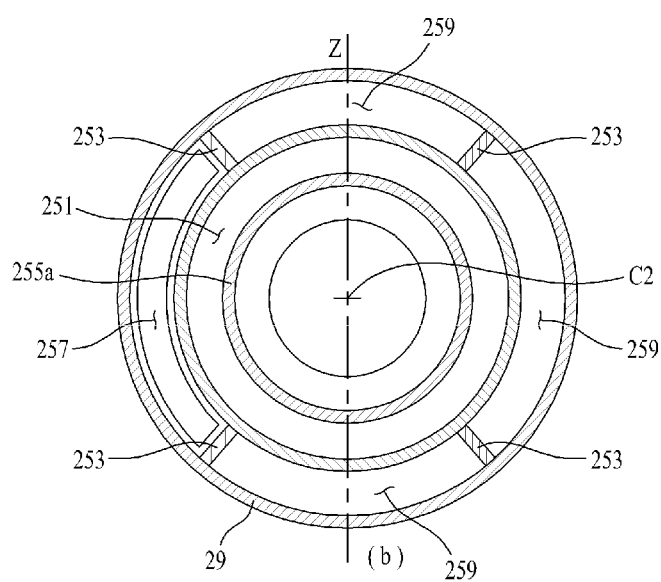

As exemplarily shown in FIG. 5, water supply guide 25 may be formed in a fourth communication portion 29 located at an upper position of the circumference of tub 2.

Fourth communication portion 29, as exemplarily shown in the drawing, may take the form of a pipe protruding from the circumference of tub 2, or may take the form of an aperture perforated in the circumference of tub 2.

Water supply guide 25 includes a trap body 251 which is accommodated in fourth communication portion 29 to provide a water storage space, shims 253 which serve to maintain a constant gap between an outer circumferential surface of trap body 251 and an inner circumferential surface of the fourth communication portion 29 and a guide pipe 255 which is fixed to the fourth communication portion 29 to guide water supplied through tub supply pipe 55 into trap body 251.

Guide pipe 255 may include a guide pipe body 255a configured to guide water into trap body 251 and a flange 255b formed at the circumference of guide pipe body 255a to fix guide pipe body 255a to the fourth communication portion 29.

A diameter of guide pipe body 255a is determined such that an outer circumferential surface of guide pipe body 255a is spaced apart from an inner circumferential surface of trap body 251 by a predetermined distance. A length of guide pipe body 255a is determined such that the bottom of guide pipe body 255a, from which water is discharged, is spaced apart from the bottom of the trap body 251 by a predetermined distance.

Flange 255b must be configured to clog a space between the outer circumferential surface of guide pipe body 255a and the inner circumferential surface of the fourth communication portion 29. As exemplarily shown in FIG. 5, flange 255b may be supported by an upper surface of the fourth communication portion 29.

Accordingly, water supplied into detergent reservoir 53 through water supply flow path 43 is supplied into trap body 251 through tub supply pipe 55 and guide pipe body 255a and, in turn, the water supplied into trap body 251 is introduced into tub 2 through a space between the inner circumferential surface of trap body 251 and the outer circumferential surface of guide pipe body 255a and a space between the outer circumferential surface of trap body 251 and the inner circumferential surface of the fourth communication portion 29.

A constant amount of water is always stored in trap body 251 and the bottom of guide pipe body 255a (not provided with flange 255b) is continuously immersed in the water stored in trap body 251, which prevents humid air within tub 2 from being supplied into detergent supply unit 5.

Additionally, water supply guide 25 as described above is located in the fourth communication portion 29 at a position spaced apart from a vertical line X passing a rotation center C1 of drum 3 in a width direction Y of tub 2 by a predetermined distance. As such, water supply guide 25 may function to prevent water supplied into tub 2 during drying from reaching laundry stored in drum 3.

Moreover, the effects as described above may be maximized by positioning the fourth communication portion 29 such that water supply guide 25 is located between a vertical line X1 tangent to the circumference of drum 3 and a vertical line X2 tangent to the circumference of tub 2 in a height direction of tub 2.

Meanwhile, in a case in which positioning water supply guide 25 at the above-described position is difficult, a flow path defined in water supply guide 25 may be positioned at the above-described position to achieve the effects as described above.

As exemplarily shown in FIG. 5(b), the plural shims 253 may be arranged on the outer circumferential surface of trap body 251 to fix trap body 251 to the fourth communication portion 29. Space between the respective two neighboring shims 253 serve as flow paths through which water inside trap body 251 is introduced into tub 2.

Accordingly, when some of the spaces between the respective neighboring shims 253 have closed planes 259 and the other spaces have open planes 257 and each open plane 257 is located between vertical line X1 and vertical line X2, it is possible to prevent water supplied into tub 2 during drying from reaching laundry.

That is, open plane 257 may take the form of a semicircle or arc located farther away from the vertical line X passing the rotation center C1 of drum 3 on the basis of a line Z that passes a center C2 of the fourth communication portion 29 and is parallel to the longitudinal direction of tub 2.

When open plane 257 has an arc shape, the length of open plane 257 may be a quarter of the perimeter of trap body 251 or more and less than the perimeter of trap body 251. When viewed in terms of angle, the center of the arc-shaped open plane 257 may be 45 degrees or more and less than 180 degrees on the basis of the center C2 of the fourth communication portion 29.

The shape and positional features of open plane 257 as described above are given to prevent water supplied during drying from reaching laundry and to minimize increase of a water supply time during washing.

Hereinafter, a drying system (a process of drying laundry by supplying heated air to the laundry) realized by laundry treatment apparatus 100 of the present invention as described above will be described with reference to FIG. 2.

When fan 71 is operated, interior air of tub 2 is introduced into circulation duct 7 through first communication portion 26 and, in turn, the air introduced into circulation duct 7 is heated by the heater 73 and thereafter supplied into tub 2 through second communication portion 27. The air supplied into tub 2 undergoes heat exchange with laundry stored in drum 3 and thereafter moves to the first communication portion 26.

The surface of tub 2 is kept at a lower temperature than at the center of tub 2 because of heat exchange between tub 2 and interior air of cabinet 1 (or air introduced into cabinet 1 through a cabinet opening 19, for example). Accordingly, as air discharged from drum 3 is cooled while moving to the first communication portion 26, some moisture contained in the air is condensed at the inner circumferential surface of tub 2.

Accordingly, tub 2, circulation duct 7, fan 71, and heater 73 according to the present invention constitute a circulation drying system (including a first heat exchange flow path and the heating unit) that implements dehumidification of air discharged from tub 2, heating of the dehumidified air and resupply of the heated air to tub 2.

Meanwhile, some of the air exchanged heat with the laundry is discharged from tub 2 through exhaust duct 83 and the remaining air is collected into circulation duct 7 through the first communication portion 26. In this process, the air is mixed with outside air introduced into tub 2 through suction duct 81.

Although the air discharged from drum 3 is dehumidified via heat exchange with tub 2 while moving to the first communication portion 26, the air collected in circulation duct 7 may not remain in a sufficiently dehumidified state according to the quantity of laundry (i.e., the quantity of laundry stored in drum 3). Exhaust duct 83 and suction duct 81 serve to solve this problem.

That is, according to the present invention, some air introduced into the first communication portion 26 is discharged from cabinet 1 through exhaust duct 83, which may reduce the quantity of humid air to be introduced into circulation duct 7. In addition, dry air (outside air of tub 2) supplied through suction duct 81 is mixed with air moved from tub 2 to circulation duct 7, which may reduce the humidity of air to be directed to heater 73 to a desired level.

Suction duct 81, fan 71, heater 73, and exhaust duct 83 according to the present invention constitute an exhaust drying system (including a second heat exchange flow path and the heating unit) that serves not only to heat outside air of the tub 2 so as to supply the heated air into tub 2, but also to discharge some of air exchanged heat with laundry from tub 2.

Accordingly, owing to a combined drying system of the circulation drying system and the exhaust drying system, the present invention may prevent deterioration of drying efficiency regardless of the quantity of laundry or the kind of laundry (regardless of the humidity of air discharged from tub 2).

To achieve the effects as described above, exhaust duct 83 and suction duct 81 may always remain in an open state during drying and the quantity of air introduced into circulation duct 7 through suction duct 81 (suction capacity) and the quantity of air discharged from tub 2 through exhaust duct 83 (exhaust capacity) may be equal to each other.

Meanwhile, the exhaust capacity may be set to be greater than the suction capacity when coincidence of the suction capacity and the exhaust capacity is difficult, although coincidence of the suction capacity and the exhaust capacity provides maximum drying efficiency.

When the suction capacity is greater than the exhaust capacity, the quantity of hot air supplied into tub 2 increases and, in turn, an increase in the quantity of hot air supplied into tub 2 means increase in the quantity of air to be dehumidified in tub 2. Thus, when suction duct 81 and exhaust duct 83 are configured such that the suction capacity is greater than the exhaust capacity, drying laundry without using cooling water may cause deterioration of drying efficiency. Accordingly, the exhaust capacity may be set to be greater than the suction capacity.

Although the drying system as described above has a risk of increasing drying time according to the quantity of laundry, the present invention has solved this problem via control of water supply unit 4. That is, the drying system according to the present invention may solve the above-described risk as the controller (not shown) controls water supply unit 4 so as to supply water to the inner circumferential surface of tub 2 during drying of laundry.

Supplying water via the water supply unit 4 to the inner circumferential surface of tub 2 during drying causes rapid cooling of the inner circumferential surface of tub 2, which may allow air introduced into circulation duct 7 to remain at a low humidity (in other words, may allow air introduced into the circulation duct 7 to remain at high dryness).

The water supplied into tub 2 via water supply unit 4 moves to drain unit 6 along the inner circumferential surface of tub 2 under guidance of water supply guide 25 and, therefore, there is substantially less risk of the water reaching laundry stored in drum 3 thus causing increased drying time.

Meanwhile, to conserve water, supplying water into tub 2 via water supply unit 4 is implemented according to user selection. To this end, control panel 17 may further include a first mode selection part 171 for drying of laundry via supply of water into tub 2 and a second mode selection part 173 for drying of laundry without supply of water into tub 2 (see FIG. 1(*b*)).

Figure 6:
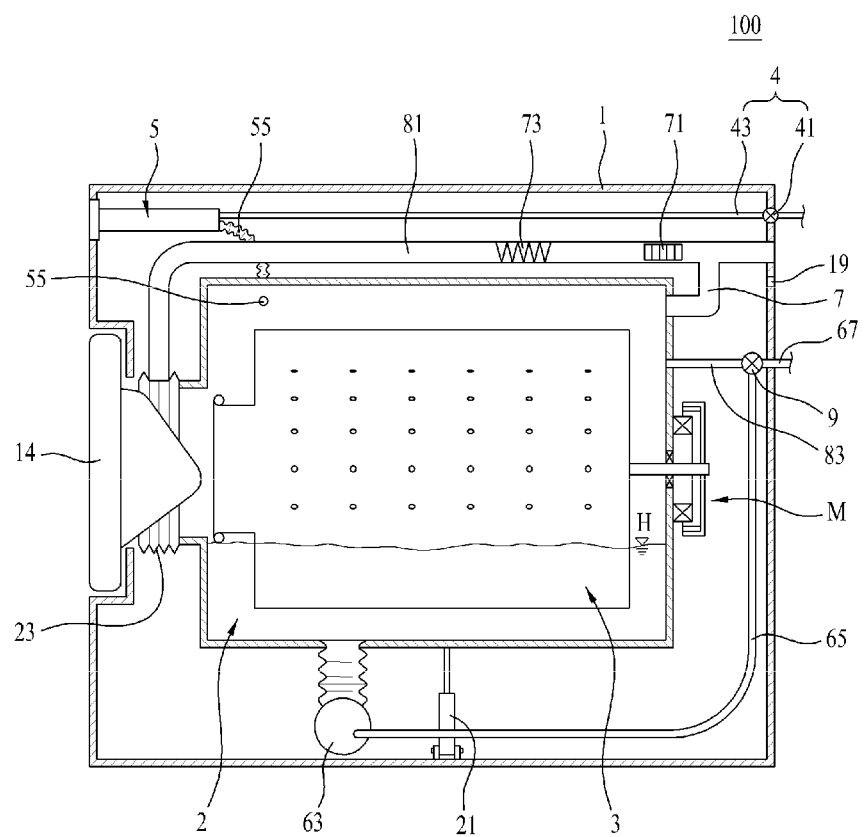
FIG. 6 shows another embodiment of the laundry treatment apparatus according to the present invention.

Meanwhile, laundry treatment apparatus 100 of the present invention as described above may have a configuration as exemplarily shown in FIG. 6.

Laundry treatment apparatus 100 as exemplarily shown in FIG. 6 has substantially the same configuration as the laundry treatment apparatus as exemplarily shown in FIGS. 1 to 5 except for a connection relationship between circulation duct 7, the suction duct 81 and exhaust duct 83.

More specifically, according to the embodiment shown in FIG. 6, tub 2 receives outside air (interior air of cabinet 1 or outside air of cabinet 1) through suction duct 81, interior air of tub 2 is discharged from exhaust duct 83, and some of the interior air of tub 2 is guided to suction duct 81 through circulation duct 7 (connection duct).

Fan 71 and heater 73 are accommodated in suction duct 81, and circulation duct 7 is connected to a flow path of suction duct 81 through which air is guided to fan 71 (i.e., the circulation duct is connected between fan 71 and an inlet of suction duct 81).

In the present embodiment, similarly, the circulation drying system is defined by a first heat exchange flow path and heating unit 71/73. The first heat exchange flow path is constructed by tub 2, circulation duct 7 (connection duct), and a partial flow path of suction duct 81 through which air having passed through fan 71 is guided into tub 2.

Meanwhile, in the present embodiment, the exhaust drying system is defined by a second heat exchange flow path and heating unit 71/73, and the second heat exchange flow path is constructed by suction duct 81, tub 2, and exhaust duct 83.

Accordingly, the present embodiment may also have the same effects as those of the above embodiment described with reference to FIGS. 1 to 5.

Figure 7:
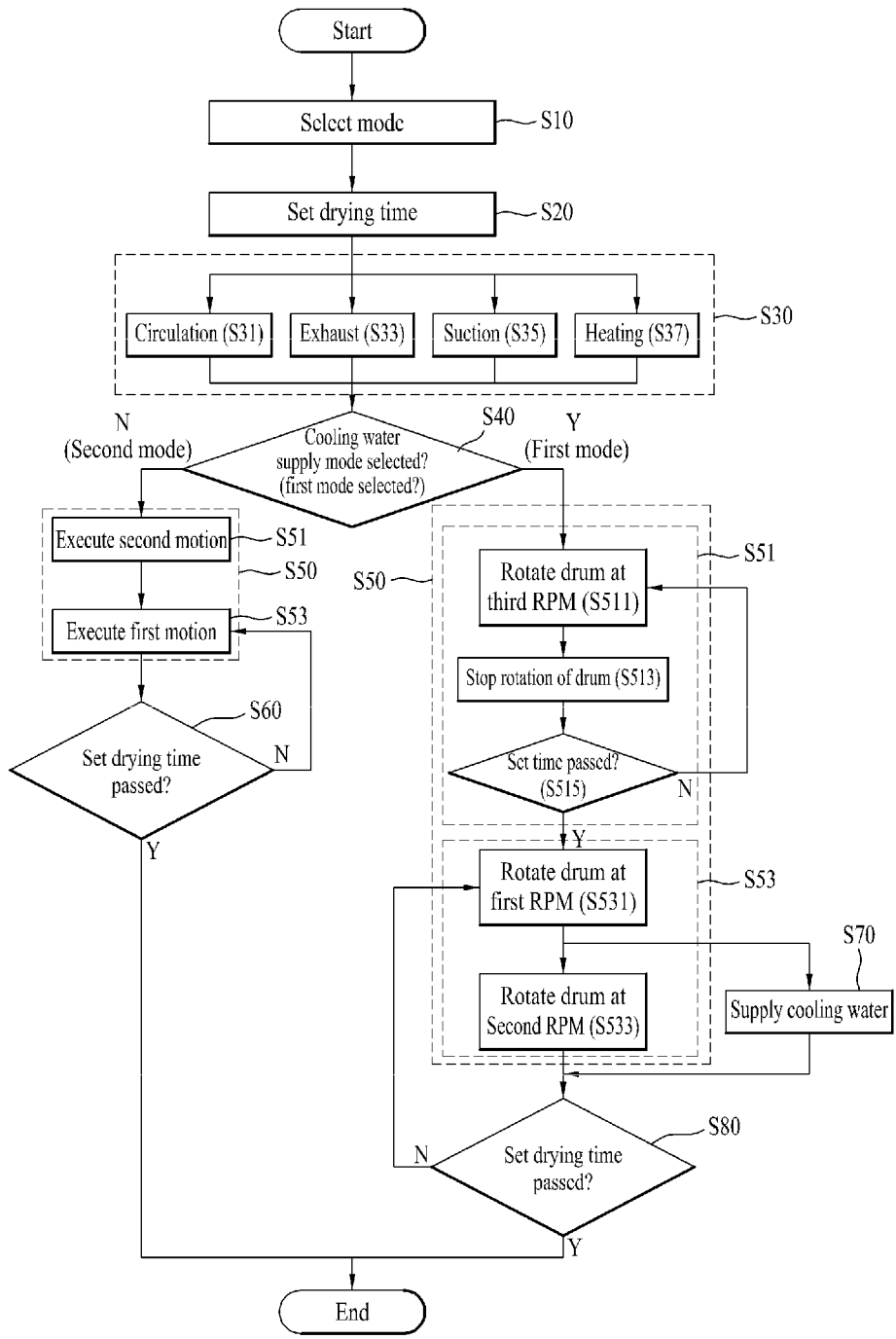
FIG. 7 shows a control process of the laundry treatment apparatus according to the present invention.

FIG. 7 shows a control method of laundry treatment apparatus 100 as described above. The control method of laundry treatment apparatus 100 according to the present invention may include drying operation S30 for supplying heated air into tub 2 and motion execution operation S50 for rotating drum 3 based on predetermined motion during implementation of drying operation S30.

Drying operation S30 includes a circulation process S31 for discharging interior air of tub 2 from tub 2 and thereafter resupplying the air to tub 2, an exhaust process S33 for discharging some of the air supplied into tub 2 from tub 2, a suction process S35 for mixing circulated air via circulation process S31 with outside air of tub 2 and a heating process S37 for heating the air to be supplied into the tub 2.

Circulation process S31 is a process in which interior air of tub 2 moves through circulation duct 7 via operation of fan 71. Circulation process S31 is initiated simultaneously with operation of fan 71. During circulation process S31, only some of the interior air of tub 2 is introduced into circulation duct 7. That is, some of the interior air of tub 2 is resupplied to tub 2 via the circulation process S31 and some of the interior air of tub 2 is discharged from tub 2 via exhaust process S33.

Exhaust process S33 is implemented using exhaust duct 83 and, therefore, air discharged from tub 2 via exhaust process S33 moves to the outside of laundry treatment apparatus 100 through flow path switching unit 9 and third drain flow path 67.

Suction process S35 is implemented using suction duct 81 and suction duct 81 is installed to first communication portion 26 that connects circulation duct 7 and tub 2 to each other. Therefore, it will be appreciated that suction process S35 is initiated when circulation process S31 is initiated by operation of fan 71.

Heating process S37 is a process of heating mixed air in circulation duct 7 using heater 73, the mixed air being acquired via circulation process S31 and suction process S35.

Through the drying operation S30 as described above, the present invention may implement supply of heated air, dehumidification of air exchanged heat with laundry, re-heating of some of air discharged from the tub, exhaust of some of air discharged from the tub, and supply of reheated air to laundry.

Motion execution operation S50 is implemented during drying operation S30. Motion execution operation S50 may be implemented to execute any one of first motion and second motion, or a first motion execution process S53 and a second motion execution process S51 may be implemented in a preset sequence.

The first motion execution process S53 is a process of rotating drum 3 based on first motion. The first motion is motion in which drum 3 is rotated in any one direction among a clockwise direction and a counterclockwise direction to cause laundry to repeatedly come into close contact with and be separated from the inner circumferential surface of drum 3

(without tumbling), thereby achieving enhanced heat exchange efficiency between the laundry and hot air supplied into tub 2.

The first motion execution process S53 may include a process of rotating drum 3 at first Revolutions Per Minute (RPM) (reference RPM) (S531), the first RPM being RPM at which the centrifugal force of laundry caused via rotation of drum 3 becomes greater than the weight of laundry, a process of rotating drum 3 at second RPM (S533), the second RPM being set to be greater than the first RPM, and a process of repeating the two processes S531 and S533 a predetermined number of times or for a predetermined time period.

In the process of rotating drum 3 at the first RPM S531 and in the process of rotating drum 3 at the second RPM S533, drum 3 is rotated in the same direction and the first RPM and the second RPM are RPMs that cause laundry to be rotated along with drum 3. Therefore, during the first motion execution process S53, laundry will exhibit movement as exemplarily shown in FIG. 8.

Figure 8:
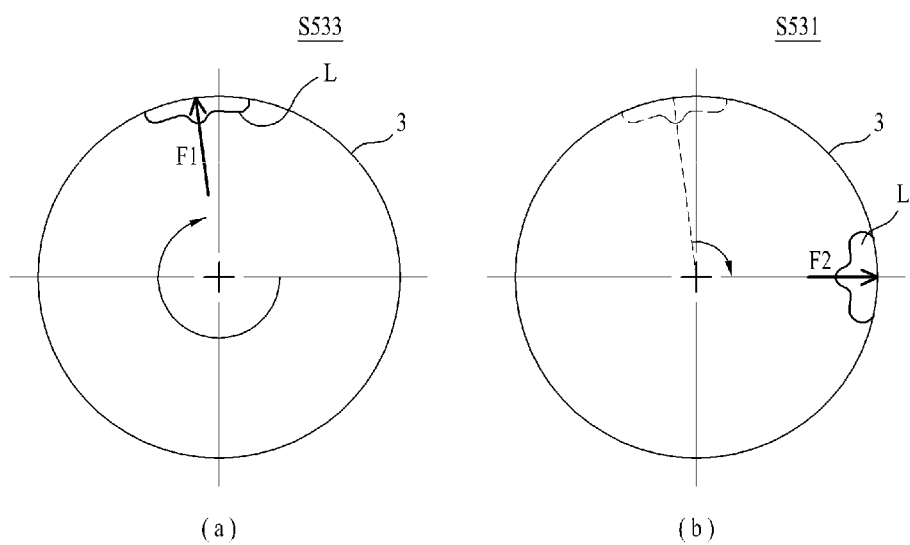
FIGS. 8a-8c and 9a-9d respectively show first motion and second motion.
Figure 8:
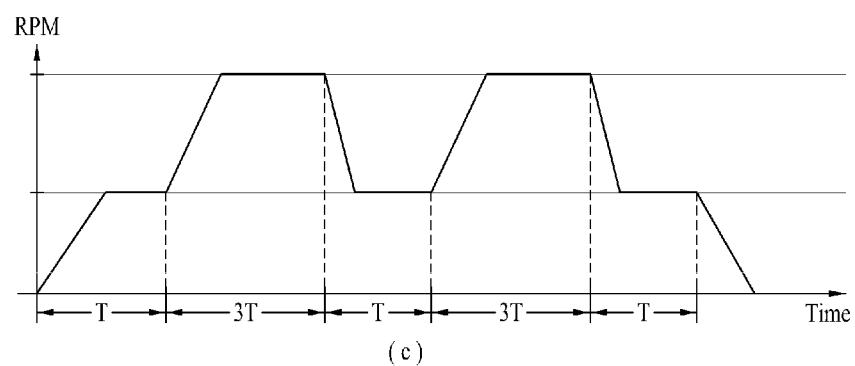

That is, when drum 3 is rotated at the first RPM, laundry L remains in close contact with the inner circumferential surface of drum 3 for a given time (see FIG. 8(*b*)). When drum 3 is rotated at the second RPM, laundry L remains in close contact with the inner circumferential surface of drum 3 for a given time, but is in closer contact with the inner circumferential surface of drum 3 than when drum 3 is rotated at the first RPM (see FIG. 8(*a*)).

This is because the second RPM is greater than the first RPM and, therefore, the centrifugal force of laundry L caused when drum 3 is rotated at the second RPM is greater than the centrifugal force of laundry L caused when drum 3 is rotated at the first RPM.

The reason for setting the first RPM and the second RPM to values that cause the laundry L to come into close contact with the inner circumferential surface of drum 3 so as to be rotated along with the drum 3 is to attain a space for movement of hot air within drum 3. Through this first motion, the surface area of laundry L that may come into contact with hot air supplied into tub 2 is maximized, which may increase heat exchange efficiency between the laundry L and the hot air supplied into tub 2.

Meanwhile, the reason for setting the first RPM and the second RPM to different values is to allow through-holes 33 of drum 3 to be opened and closed by laundry L. That is, this serves to confine hot air in drum 3 while drum 3 is rotated at the second RPM and to discharge interior air of drum 3 into tub 2 while drum 3 is rotated at the first RPM.

In the case of conventional laundry treatment apparatuses, some hot air introduced into drum 3 is discharged to tub 2 after undergoing heat exchange with the laundry, but some of the air introduced into drum 3 is directly discharged to tub 2 through through-holes 33 of drum 3 without heat exchange with laundry. Therefore, the conventional laundry treatment apparatuses suffer from increased energy consumption due to low heat exchange efficiency between hot air and laundry.

The present invention may solve the above problem of the conventional laundry treatment apparatuses by controlling the RPM of drum 3.

A larger quantity of laundry will be distributed to cover the entire inner circumferential surface of drum 3 and come into close contact with the inner circumferential surface of drum 3 by high centrifugal force when drum 3 is rotated at the second RPM. Therefore, rotating drum 3 at the second RPM may minimize discharge of hot air from drum 3 to tub 2 through through-holes 33.

In addition, when drum 3 is rotated at the first RPM, laundry will remain in close contact with the inner circumferential surface of drum 3 by relatively low centrifugal force and, therefore, hot air may be discharged from drum 3 to tub 2 through through-holes 33.

Time, which is set for the process of rotating drum 3 at the second RPM S533 to further enhance heat exchange efficiency between laundry and hot air, may be longer than time set for the process of rotating drum 3 at the first RPM S531.

Since condensation efficiency of air moving to circulation duct 7 may vary according to a discharge time of hot air from drum 3 to tub 2 (i.e., the quantity of hot air discharged to tub 2), time for rotation of drum 3 at the first RPM and time for rotation of drum 3 at the second RPM are set to a given ratio. FIG. 8 shows a case in which a ratio of the time for rotation of drum 3 at the first RPM to the time for rotation of drum 3 at the second RPM is 1:3 by way of example.

Meanwhile, the second motion execution process S51 is a process of rotating drum 3 based on second motion. The second motion is motion in which rotation and rotation stop of drum 3 are repeated to cause laundry L to fall from above a horizontal line Y passing the rotation center C1 of drum 3 (i.e., motion to facilitate agitation of laundry and to increase heat exchange efficiency).

As exemplarily shown in FIG. 7, the second motion execution process S51 may include a process of rotating drum 3 at third RPM (S511), a process of stopping rotation of drum 3 before drum 3 completes 1 revolution (S513), and a process of repeating the two processes S511 and S513 a predetermined number of times or for a predetermined time (S515).

The third RPM is RPM at which the centrifugal force of laundry caused via rotation of drum 3 becomes greater than the weight of laundry. The third RPM may be equal to any one of the first RPM or the second RPM.

The process of stopping rotation of drum 3, S513, is initiated when laundry is raised above half the height, h, of drum 3. Thus, during implementation of the second motion execution process S51, laundry will exhibit movement as exemplarily shown in FIG. 9.

Figure 9:
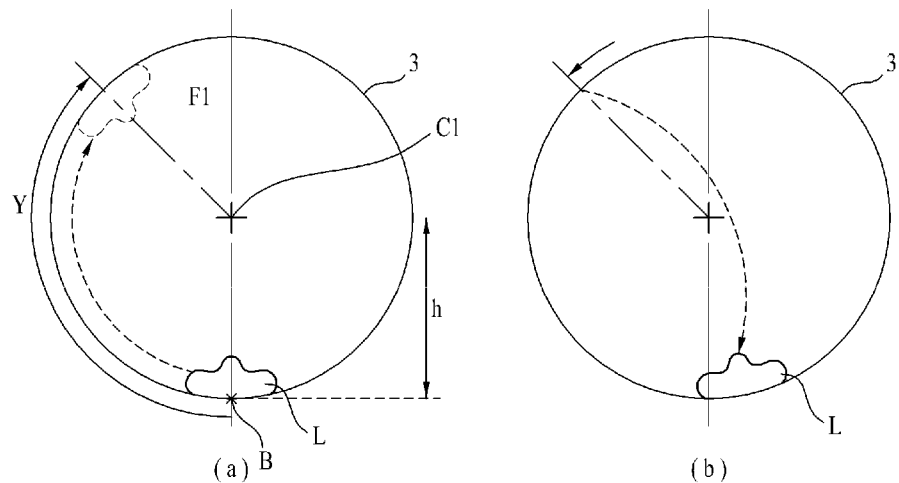
Figure 9:
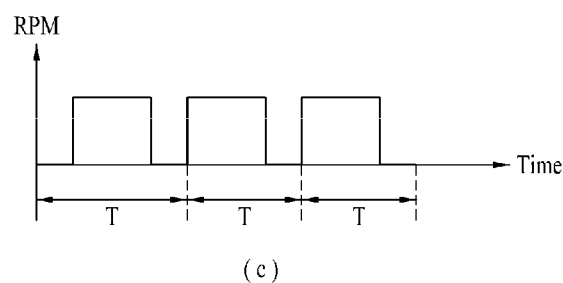
Figure 9:
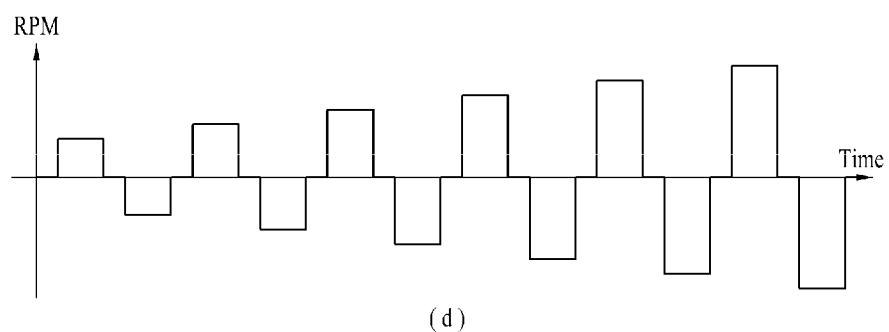

That is, when drum 3 is rotated at the third RPM (S511), laundry L is rotated along with drum 3 while coming into close contact with the inner circumferential surface of the drum 3 (see FIG. 9(*a*)). Upon rotation stop of drum 3 when the laundry L is raised above half the height, h, of drum 3, laundry L falls from above the horizontal line Y to the inner circumferential surface of drum 3 below the horizontal line Y (see FIG. 9(*b*)).

Through this second motion, the surface area of laundry L exposed to hot air supplied into drum 3 is increased and moisture contained in laundry L is easily separated when laundry L collides with the inner circumferential surface of drum 3. In this way, the present invention may achieve increased heat exchange efficiency between hot air and laundry (increased drying efficiency).

Additionally, the second motion prevents laundry L from becoming entangled in drum 3 because laundry L is repeatedly raised and dropped in drum 3.

To maximize the effects as described above, the process of stopping rotation of drum 3, S513, may be implemented by applying torque to drum 3 in a direction opposite to a rotating direction of drum 3 (i.e., a rotating direction of drum 3 at a point in time when the process of stopping rotation of drum 3, S513, is initiated). This serves to provide laundry L with greater shock force.

The process of stopping rotation of drum 3, S513, may be implemented when laundry L is rotated by an angle of 90 degrees or more and less than 180 degrees relative the lowermost point B of the rotation track of drum 3.

The second motion as described above may be set to allow drum 3 to be rotated in any one direction among a clockwise direction and a counterclockwise direction as exemplarily shown in FIG. 9(c), and may be set to allow drum 3 to alternately implement clockwise rotation and counterclockwise rotation as exemplarily shown in FIG. 9(d).

The process of rotating drum 3 at the third RPM S511 and the process of stopping rotation of drum 3, S513, are repeated a predetermined number of times or for a predetermined time. The third RPM may be gradually increased whenever the second motion is repeated.

That is, assuming that the second motion is implemented plural times, RPM for initial execution of second motion may be less than RPM for subsequent execution of second motion (see FIG. 9(d)).

Additionally, the third RPM set for the process of rotating drum 3, S511, may be increased whenever the second motion is repeated and then reduced after the second motion is repeated a predetermined number of times.

Gradually increasing the third RPM whenever the second motion is repeatedly executed may ensure easy removal of moisture contained in laundry.

Meanwhile, the second motion execution process, S51, as described above may be implemented before the first motion execution process, S53. This serves to prevent laundry from becoming entangled in drum 3 via the second motion, thereby allowing the laundry to be uniformly distributed at the inner circumferential surface of drum 3 during execution of the first motion.

In addition, time set for the first motion execution process, S53, may be longer than time set for the second motion execution process, S51. This serves to increase time during which hot air supplied into drum 3 remains in drum 3, thereby increasing heat exchange efficiency between laundry and hot air.

Although the control method of the present invention may include only the drying operation, S30, and the motion execution operation, S50, as described above, the control method may further include cooling water supply operation, S70, as exemplarily shown in FIG. 7. The cooling water supply operation, S70, is implemented to supply water to the inner circumferential surface of tub 2 during the motion execution operation, S50, thereby cooling the inner circumferential surface of tub 2 exchanged heat with air discharged from drum 3.

The cooling water supply operation, S70, according to the present invention may be implemented according to user selection. To this end, the control method of the present invention may further include mode selection operation, S10, for setting whether or not to implement the cooling water supply operation, S70, prior to initiating the drying operation, S30.

In the mode selection operation, S10, the user may input a control instruction using the first mode selection part 171 and the second mode selection part 173 provided at control panel 17.

The first mode selection part 171 is used to select a control method (so-called 'turbo drying mode') for executing the cooling water supply operation S70 during the motion execution operation S50, and the second mode selection part 173 is used to select a control method (so-called 'blow drying mode') for implementing the motion execution operation S50 without the cooling water supply operation S70.

Meanwhile, in the mode selection operation S10, the controller (not shown) selects a first mode including the cooling water supply operation S70 according to the quantity of laundry stored in drum 3 without input of a user instruction.

In any case, the control method of the present invention includes judging whether or not the first mode is selected upon initiation of the drying operation S30 (S40).

When the first mode is not selected (when the second mode is selected), the control method of the present invention executes only the second motion execution process S51 and the first motion execution process S53 in sequence. However, when the first mode is selected, the control method of the present invention executes the cooling water supply operation S70 during the first motion execution process S53.

Heat exchange efficiency between laundry and hot air is low at the initial stage of the drying operation S30. Dryness of laundry has substantially no variation until the laundry reaches a given temperature and is rapidly increased from a point in time when the laundry reaches the given temperature.

This is because moisture contained in laundry is not evaporated until the laundry reaches a given temperature. Such rapid increase in the dryness of laundry means that the humidity of air discharged from drum 3 is increased as the drying operation S30 is implemented.

Accordingly, in terms of drying of laundry, cooling tub 2 during the first motion execution process S53, which is initiated when a given time has passed after initiation of the drying operation S30 (i.e., initiated when the second motion execution process S51 ends), is more advantageous than cooling tub 2 during the second motion execution process S51 which is initiated upon initiation of the drying operation S30.

Moreover, the cooling water supply operation S70 may be implemented during the process of rotating drum 3 at the second RPM S533 which is included in the first motion execution process S51.

Thereby, even if water supplied into tub 2 through water supply unit 4 unintentionally moves to drum 3, it is possible to prevent the water from reaching laundry in drum 3 (this is because high RPM of drum 3 causes water colliding with the outer circumferential surface of drum 3 to move away from drum 3).

Thereafter, the control method of the present invention includes judging whether or not time taken for the drying operation S30 and the motion execution operation S50 exceeds drying time set in drying time setting operation S20 (S80), and ends the drying operation S30 and the motion execution operation S50 based on the judged result.

The drying time setting operation S20 may be implemented prior to initiation of the drying operation S30. In the drying time setting operation S20, the controller (not shown) may set drying time based on the quantity of laundry, or the user may input the drying time using control panel 17.

As is apparent from the above description, the present invention has the effect of providing a laundry treatment apparatus having an advanced concept drying system which may reduce consumption of energy and cooling water required to dry laundry, and a control method thereof.

In addition, the present invention has the effect of providing a laundry treatment apparatus having a drying system which may achieve enhanced drying efficiency, and a control method thereof.

In addition, the present invention has the effect of providing a laundry treatment apparatus having a cooling water supply structure which may prevent cooling water from reaching laundry to be dried, and a control method thereof.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A control method of a laundry treatment apparatus, the control method comprising:
   performing a drying operation including a circulation process for resupplying air discharged from a tub back into the tub, an exhaust process for discharging some of the air supplied into the tub from the tub, a suction process for supplying air outside of the tub into air circulated via the circulation process, and a heating process for heating the air to be supplied into the tub; and
   performing a motion execution operation for rotating a drum based on first motion during implementation of the drying operation, the drum being rotatably mounted in the tub and storing laundry therein,
   wherein the first motion includes:
   a process of rotating the drum at a first Revolutions Per Minute (RPM), the first RPM being a value at which the centrifugal force of the laundry caused via rotation of the drum is greater than the weight of the laundry; and
   a process of rotating the drum at a second RPM, the second RPM value being greater than the first RPM value.

2. The control method of claim 1, wherein time taken for the process of rotating the drum at the second RPM is longer than time taken for the process of rotating the drum at the first RPM.

3. The control method of claim 2, wherein a ratio of time taken for the process of rotating the drum at the first RPM to time taken for the process of rotating the drum at the second RPM is constant.

4. The control method of claim 1, further comprising:
   cooling water supply operation for supplying water required to cool an inner circumferential surface of the tub.

5. The control method of claim 4, further comprising:
   performing a mode selection operation for selecting whether or not to implement the cooling water supply operation prior to initiation of the drying operation.

6. The control method of claim 4, wherein the cooling water supply operation for supplying water required to cool the inner circumferential surface of the tub is implemented during the motion execution operation.

7. The control method of claim 6, wherein the cooling water supply operation is implemented while the drum is rotated at the second RPM.

8. The control method of claim 6, wherein the cooling water supply operation is implemented only while the drum is rotated at the second RPM.

9. The control method of claim 1, further comprising:
   performing a mode selection operation for selecting whether or not to supply water required to cool an inner circumferential surface of the tub into the tub during implementation of the drying operation.

10. The control method of claim 1, wherein the motion execution operation further includes second motion to be implemented prior to execution of the first motion,
    wherein the second motion includes:
    a process of rotating the drum at third RPM, the third RPM being a value at which the centrifugal force of laundry caused via rotation of the drum is greater than the weight of the laundry; and
    a process of stopping rotation of the drum before the drum completes 1 revolution.

11. The control method of claim 10, wherein the process of stopping rotation of the drum is initiated when laundry is raised above half a height of the drum or more.

12. The control method of claim 10, wherein the process of stopping rotation of the drum is implemented when laundry is rotated by an angle of between 90 degrees and 180 degrees relative a lowermost point of a rotation track of the drum.

* * * * *